(12) United States Patent
Yokota et al.

(10) Patent No.: US 10,000,228 B2
(45) Date of Patent: Jun. 19, 2018

(54) STEERING APPARATUS

(71) Applicant: YAMADA MANUFACTURING CO., LTD., Kiryu-shi (JP)

(72) Inventors: Norihiko Yokota, Kiryu (JP); Naohiro Tagaya, Kiryu (JP); Toru Ito, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 355 days.

(21) Appl. No.: 14/991,779

(22) Filed: Jan. 8, 2016

(65) Prior Publication Data
US 2016/0214639 A1 Jul. 28, 2016

(30) Foreign Application Priority Data
Jan. 27, 2015 (JP) .................... 2015-013339

(51) Int. Cl.
*B62D 1/185* (2006.01)
*B62D 1/187* (2006.01)

(52) U.S. Cl.
CPC ............. *B62D 1/187* (2013.01); *B62D 1/185* (2013.01)

(58) Field of Classification Search
CPC .................................. B62D 1/187; B62D 1/185
See application file for complete search history.

(56) References Cited

U.S. PATENT DOCUMENTS

| | | | |
|---|---|---|---|
| 2010/0242663 A1* | 9/2010 | Takezawa | B62D 1/184 74/493 |
| 2012/0247258 A1* | 10/2012 | Maniwa | B62D 1/184 74/493 |
| 2015/0232116 A1* | 8/2015 | Yokota | B62D 1/192 74/493 |
| 2016/0214639 A1* | 7/2016 | Yokota | B62D 1/187 |
| 2016/0251026 A1* | 9/2016 | Takahashi | B62D 1/184 74/493 |

FOREIGN PATENT DOCUMENTS

| | | |
|---|---|---|
| JP | 2005-335491 A | 12/2005 |
| JP | 2010-254290 A | 11/2010 |
| WO | WO-2015064345 A1 * 5/2015 | ............. B62D 1/184 |

* cited by examiner

*Primary Examiner* — Ruth Ilan
(74) *Attorney, Agent, or Firm* — McGinn IP Law Group, PLLC

(57) ABSTRACT

A steering apparatus includes: a fixed bracket; an outer column; an arm portion; a column pipe; a steering shaft A including an upper shaft rotatably attached to the column pipe and a lower shaft which is connected by an universal joint and in which a male shaft and a female shaft engage with each other so as to freely extend and contract; and a fastening tool. The arm portion includes: bifurcated arm-shaped portions that extend from a front side in the axial direction of the outer column toward an outer side in the axial direction; a first linking portion formed between the arm-shaped portions so as to protrude upward from upper edges of the arm-shaped portions; and a second linking portion that protrudes downward from lower edges of the arm-shaped portions, and the second linking portion protrudes from the arm-shaped portions by a larger amount than the first linking portion.

8 Claims, 6 Drawing Sheets

CONVENTIONAL TECHNIQUE

STEERING APPARATUS

BACKGROUND OF THE INVENTION

1. Field of the Invention

The present invention relates to a steering apparatus which has a mechanism for tilt/telescopic adjustments of a steering column, which can be satisfactorily assembled with a vehicle body, and which can enhance the rigidity of the apparatus itself.

2. Description of the Related Art

Generally, various steering apparatuses having a tilt/telescopic adjustment mechanism are known. A general steering apparatus of this type has a structure including a fixed bracket fixed to a vehicle body side, an inner column that rotatably supports a steering shaft, a steering support that supports the inner column so as to be slidable in an axial direction, and fastening means for fastening the inner column with the steering support interposed by fastening the fixed bracket (see FIGS. 6A and 6B).

Figure 6A:
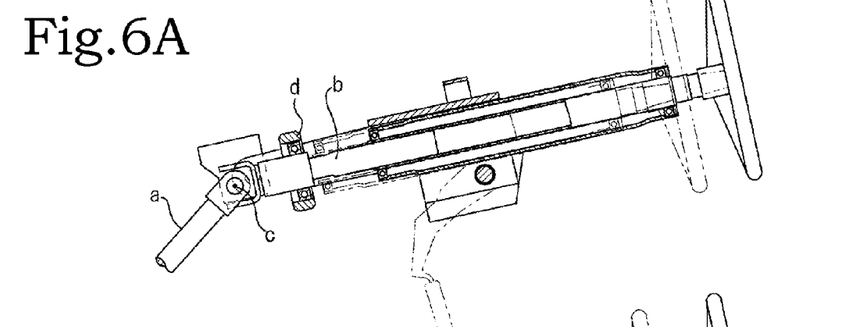
FIG. 6A is a vertical cross-sectional side view of a conventional steering apparatus having a tilt/telescopic function of allowing an upper shaft to extend and contract.
Figure 6B:
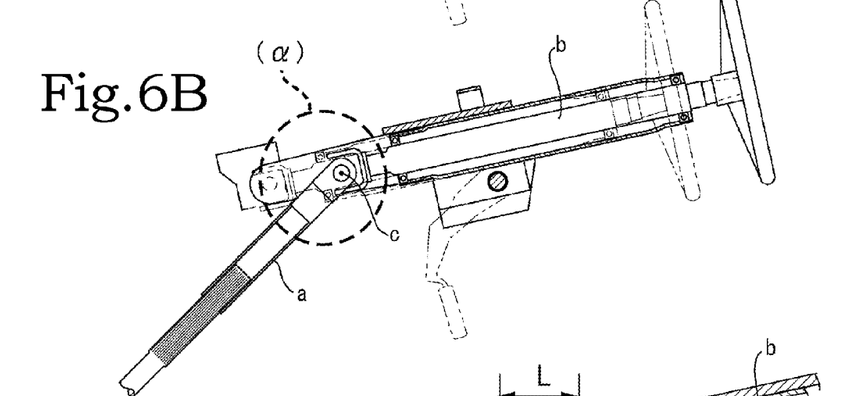
FIG. 6B is a vertical cross-sectional side view of a steering apparatus having a tilt/telescopic function of allowing a lower shaft to extend and contract.

FIGS. 6A and 6B illustrate a conventional steering apparatus which forms a tilt/telescopic adjustment mechanism. The steering apparatus includes a lower shaft a that is positioned on a front side of a vehicle body and connected to the steering apparatus, an upper shaft b positioned on a rear side of the vehicle body with a steering wheel attached thereto, and a universal joint c that connects both shafts. In FIG. 6A, the upper shaft b includes a telescopic mechanism which is realized by a spline or the like and which allows the upper shaft b to extend and contract in a front-rear direction (axial direction) to perform telescopic adjustment.

The upper shaft b is accommodated in the inner column with a bearing interposed so as to be rotatable around the axial direction. During the telescopic adjustment, the upper shaft b only extends and contracts but the lower shaft a does not extend and contract. Thus, the lower shaft a and the universal joint c can maintain an approximately immovable state (see FIG. 6A).

As described above, a steering apparatus in which a telescopic mechanism is provided in an upper shaft and which includes a tilt/telescopic mechanism which enables telescopic adjustment is disclosed in Japanese Patent Application Publication No. 2010-254290. In Japanese Patent Application Publication No. 2010-254290, a bifurcated arm-shaped portion that plays a role of allowing an outer column to swing in an up-down direction for tilt adjustment is formed on a front side of the vehicle body. A linking portion d is formed between two arm-shaped pieces that form the bifurcated arm-shaped portion. A circular through-hole to which a bearing that supports the upper shaft b is attached is formed in the linking portion d.

That is, the steering apparatus has a structure in which the inner column and the upper shaft b only move telescopically in relation to the outer column, and the universal joint c that connects the upper shaft b and the lower shaft a is immovable during the telescopic adjustment. Thus, during the telescopic adjustment, the universal joint does not interfere with the linking portion d. Therefore, the linking portion d can be provided between the two arm-shaped pieces of the bifurcated arm-shaped portion without taking the operation of the lower shaft a into consideration, and the rigidity of the bifurcated arm-shaped portion can be improved.

SUMMARY OF THE INVENTION

Moreover, a steering apparatus illustrated in FIG. 6B has a configuration in which a lower shaft of a steering shaft is allowed to extend and contract in an axial direction with the aid of a spline mechanism and an upper shaft does not extend and contract in the axial direction.

Figures 6C, 6D:
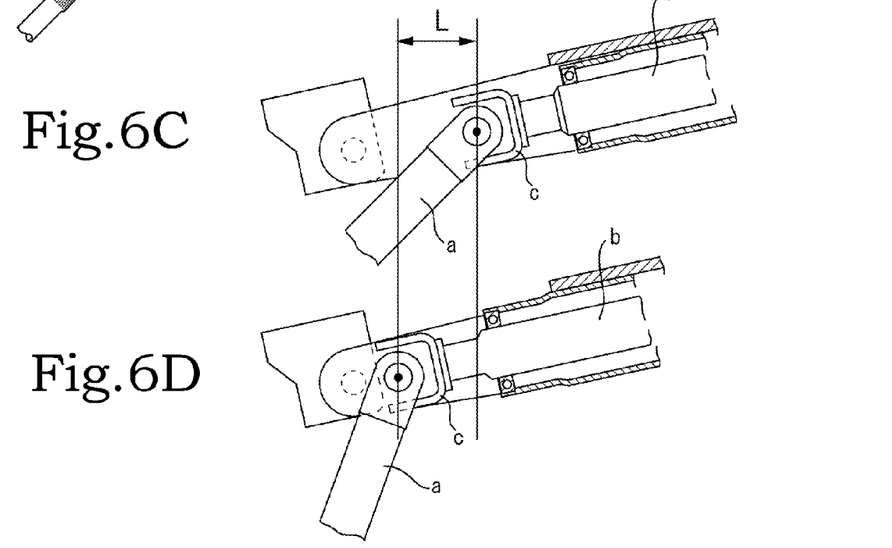
FIGS. 6C and 6D are enlarged views illustrating an operation of the (α)-portion in FIG. 6B.

In this case, when telescopic adjustment is performed, the lower shaft a extends and contracts whereby a universal joint in the portion indicated by (α) in FIG. 6B also moves a predetermined distance L from the position before adjustment (see FIGS. 6C and 6D). The universal joint c moves greatly in the axial direction between the arm-shaped pieces of the bifurcated arm-shaped portion of the outer column. Thus, if the linking portion d described above were provided between the arm-shaped pieces of the bifurcated arm-shaped portion, the lower shaft a and the universal joint c may interfere with the linking portion d with the movement operation of the lower shaft during the tilt/telescopic adjustment and the movement operation may be disturbed.

In Japanese Patent Application Publication No. 2005-335491, the universal joint moves following the telescopic adjustment of the inner column. Moreover, the bifurcated arm-shaped portion in which a pivot portion is formed extends from an upper end of a portion that holds the inner column. Thus, the linking portion d is not present. Therefore, the bifurcated arm-shaped portion disclosed in Japanese Patent Application Publication No. 2005-335491 has weak rigidity.

Therefore, an object (technical problem) of the present invention is to provide a steering apparatus which includes a tilt/telescopic adjustment mechanism and is particularly ideal for a structure in which the tilt/telescopic adjustment mechanism allows a lower shaft positioned on a front side of a vehicle body to extend and contract and which improves the rigidity of an outer column.

As a result of intensive studies to solve the above problems, the present inventor solved the problems by providing, as a first embodiment, a steering apparatus including: a fixed bracket having fixing side portions on both sides in a width direction; an outer column attached to the fixed bracket so as to freely swing; an arm portion; a column pipe; a steering shaft including an upper shaft which is rotatably attached to the column pipe and a lower shaft which is connected to the upper shaft by an universal joint and in which a male shaft and a female shaft engage with each other so as to freely extend and contract; and a fastening tool, wherein the arm portion includes: bifurcated arm-shaped portions that extend from a front side in an axial direction of the outer column toward an outer side in the axial direction; a first linking portion formed between the arm-shaped portions so as to protrude upward from upper edges of the arm-shaped portions; and a second linking portion that protrudes downward from lower edges of the arm-shaped portions, and the second linking portion protrudes from the arm-shaped portions by a larger amount than the first linking portion.

A second embodiment of the present invention solves the problems by the steering apparatus according to the first embodiment, in which the first linking portion is formed in a circular arc shape that protrudes upward, the second linking portion is formed in a circular arc shape that protrudes downward, and the second linking portion has a smaller radius of curvature than the first linking portion. A third embodiment of the present invention solves the problems by the steering apparatus according to the first or second embodiment, in which the first and second linking portions are formed at front-side ends of the arm-shaped portions.

A fourth embodiment of the present invention solves the problems by the steering apparatus according to the first or second embodiment, in which the positions of the first and second linking portions in a front-rear direction are shifted from each other. A fifth embodiment of the present invention solves the problems by the steering apparatus according to the first or second embodiment, in which a dimension of the second linking portion in a front-rear direction is smaller than that of the first linking portion.

The present invention provides the steering apparatus including the steering shaft which includes the lower shaft that extends and contracts in the axial direction with the configuration in which the male shaft and the female shaft engage with each other, the upper shaft that does not extend and contract in the axial direction, and the universal joint that connects these shafts. During telescopic adjustment, the lower shaft extends and contracts in the axial direction. Thus, the rear-side end of the lower shaft, the front-side end of the upper shaft, and the universal joint move greatly in the up-down direction as well as the front-rear direction.

In the present invention, the first and second linking portions formed in the arm-shaped portions of the arm portion protrude in the up-down direction of the arm-shaped portions, and the second linking portion protrudes from the arm-shaped portions by a larger amount than the first linking portion. Thus, the rear-side end of the lower shaft, the front-side end of the upper shaft, and the universal joint can pass between the first and second linking portions in a non-contacting manner and mutual interference can be prevented. Moreover, since the first linking portion protrudes by a smaller amount than the second linking portion, it is possible to reduce the space on the upper side of the arm portion and the ability to assemble the steering apparatus into the vehicle body can be improved. Further, although the first and second linking portions require different rigidity, it is possible to reduce the entire weight by forming the first and second linking portions in a shape ideal for the respective rigidity.

DESCRIPTION OF THE PREFERRED EMBODIMENTS

Hereinafter, embodiments of the present invention will be described with reference to the drawings. In the following description, directions are represented by a front-rear direction, a front side, a rear side, and a width direction. The front-rear direction is defined by a front-rear direction of a vehicle body of a vehicle. The front and rear sides are defined such that a front wheel side of the vehicle is a front side and a steering wheel side is a rear side in a state in which the steering apparatus of the present invention is attached to the vehicle. The width direction is a left-right direction orthogonal to the front-rear direction. Moreover, the front-rear direction of the steering apparatus is sometimes referred to as an axial direction.

As illustrated in FIGS. 1A to 1D, principal components of the present invention include an outer column 1, an arm portion 2, a fixed bracket 3, a fastening tool 4, a lower bracket 5, a column pipe 6, and a steering shaft A. The steering shaft A includes a lower shaft 7, an upper shaft 8, and a universal joint 9.

The outer column 1 includes a holding body 11 and a fastening portion 12 (see FIGS. 1A to 3C). The holding body 11 is formed approximately in a cylindrical shape, and specifically, has an inner portion which is formed in a hollow shape to form a holding inner circumferential surface 11a. A slit 11b is formed on a lower side in a radial direction of the holding body 11 so as to extend from the front side in the axial direction of the holding body 11 toward the rear side. The slit 11b is discontinuous in the width direction. Both edges that face each other in the width direction of the slit 11b approach each other. Thus, the diameter of the holding inner circumferential surface 11a decreases. As a result, the column pipe 6 accommodated in and attached to the holding body 11 can be fastened and locked (fixed) by the fastening tool 4 (see FIG. 1D).

Fastening portions 12 are integrated with the lower side of the outer column 1 (see FIGS. 1B, 1D, FIGS. 3A to 3C, and the like). The fastening portions 12 have a bilaterally symmetrical shape and are integrally formed at both ends in the width direction of the slit 11b. Specifically, the fastening portions 12 are thick planar portions that are formed at both ends in the width direction of the slit 11b or formed so as to sag approximately downward from the vicinities thereof.

The fastening portions 12 are clamped by both fixing side portions 31 of the fixed bracket 3 described later and are fastened and loosened by the fastening tool 4 (see FIG. 1D). Fastening through-holes 12a are formed in the fastening portions so as to extend in a direction orthogonal to the axial direction of the outer column 1 and in a direction parallel to a horizontal radial direction of the holding body 11 (see FIG. 3A).

The arm portion 2 is formed on the front side in the front-rear direction of the holding body 11 (see FIGS. 1B and 1C, FIG. 2, and FIGS. 3A to 3C). The arm portion 2 includes two arm-shaped portions 21. The arm-shaped portions 21 are disposed in a bifurcated shape on an approximately horizontal surface, and a first linking portion 22 and a second linking portion 23 are formed at positions near the front ends of the arm-shaped portions 21 in an approximately bridge shape so as to link the arm-shaped portions 21. The details of the first and second linking portions 22 and 23 will be described later.

The fixed bracket 3 includes fixing side portions 31 formed on both sides in the width direction and an attachment apex portion 32. Adjustment holes 33 which are long in an approximately up-down direction or a vertical direction are formed in the fixing side portions 31 (see FIGS. 1A and 1D). The attachment apex portion 32 of the fixed bracket 3 is fixed by a bolt or the like at a predetermined position inside the vehicle, and the steering apparatus is attached to the vehicle body together with the fixed bracket 3. The fastening tool 4 includes a bolt shaft 41, a lock lever portion 42, a fastening cam 43, and a nut 44 (see FIG. 1D).

The arm-shaped portions 21 of the arm portion 2 are connected by the lower bracket 5 at a position located closer to the front side of the vehicle body than the fixed bracket 3. The lower bracket 5 has an approximately door shape and includes sagging planar portions 51 and a linking plate 52 (see FIG. 1C). The sagging planar portions 51 is configured to realize tilt adjustment by supporting the arm-shaped portions 21 of the arm portion 2 so as to freely swing in the up-down direction to allow the outer column A to swing together with the arm portion 2.

Figure 1A:
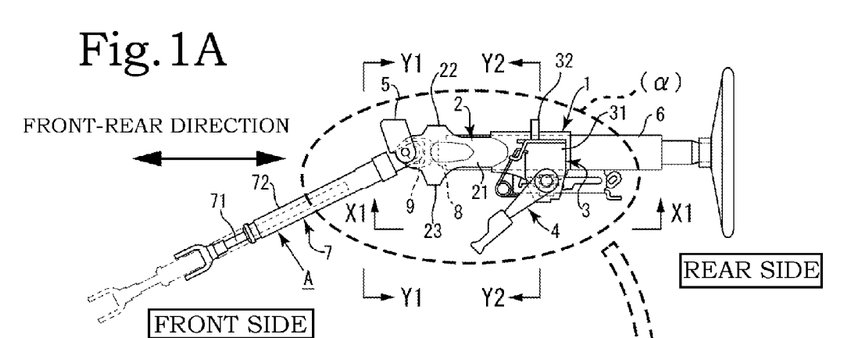
FIG. 1A is a side view of the present invention.
Figure 1B:
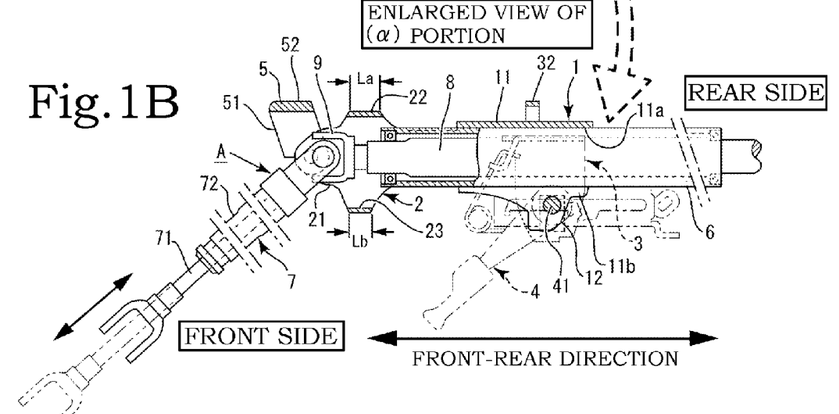
FIG. 1B is an enlarged cross-sectional view of a portion (hereinafter referred to as "(α)-portion) indicated by "(α)" in FIG. 1A.
Figure 1C:
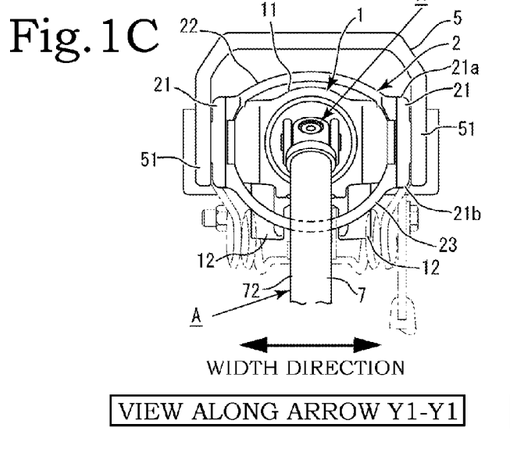
FIG. 1C is an enlarged view taken along arrow Y1-Y1 in FIG. 1A.
Figure 1D:
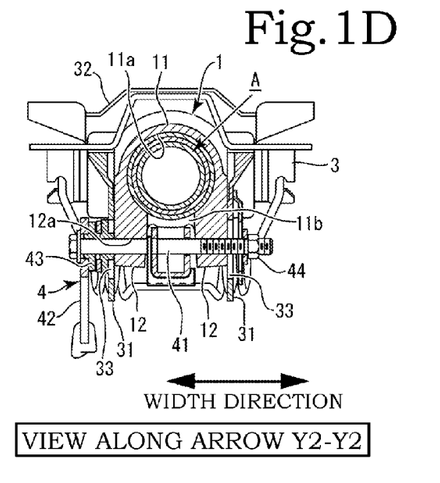
FIG. 1D is an enlarged cross-sectional view taken along arrow Y2-Y2 in FIG. 1A.
Figure 2:
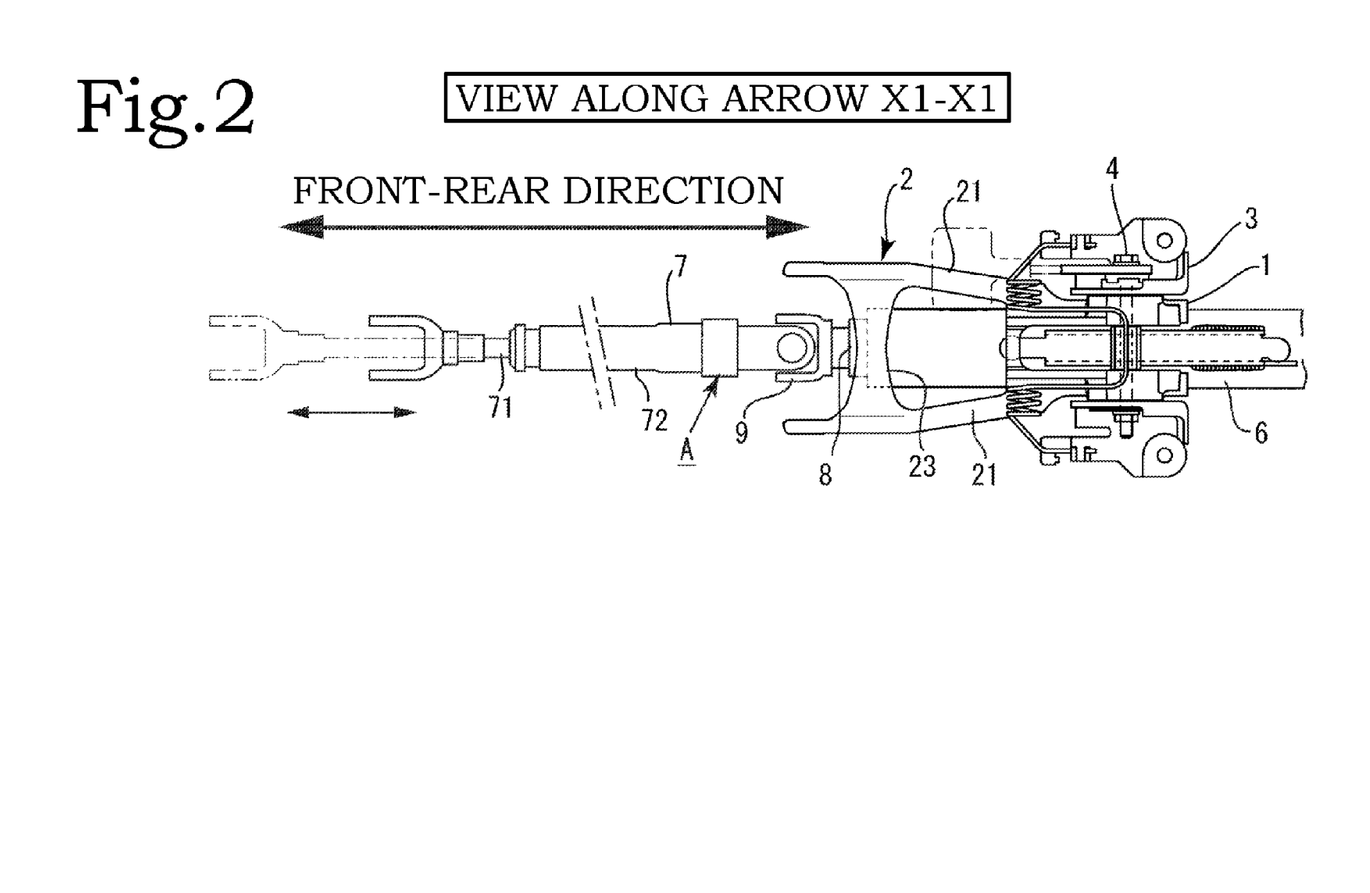
FIG. 2 is a view taken along arrow X1-X1 in FIG. 1A.

The steering shaft A includes the lower shaft 7, the upper shaft 8, and the universal joint 9, and the lower shaft 7 and the upper shaft 8 are connected by the universal joint 9 (see FIGS. 1A and 1B and FIG. 2). The steering shaft has such a configuration that the lower shaft 7 is positioned on the front side and the upper shaft 8 is positioned on the rear side. The upper shaft 8 is supported and accommodated on the inner side of the column pipe 6 with a bearing interposed so as to freely rotate.

The universal joint 9 is provided on the vehicle front side of the upper shaft 8, and the upper shaft 8 and the lower shaft 7 are connected by the universal joint 9. The lower shaft 7 has such a structure that extends and contracts in the axial direction and the upper shaft 8 has such a structure that does not extend and contract in the axial direction (see FIGS. 1A and 1B, FIG. 2, and FIGS. 4A to 4C).

The lower shaft 7 has a male shaft 71 and a female shaft 72 (see FIGS. 1A and 1B and FIG. 2), and a telescopic structure thereof is realized by the male shaft 71 and the female shaft 72. The male shaft 71 has a male spline and the female shaft 72 has a female spline. The male shaft 71 and the female shaft 72 are connected in such a way that the male spline and the female spline engage with each other so as to freely slide in relation to each other.

With the mutual sliding operation in the axial direction of the male shaft 71 and the female shaft 72, the lower shaft 7 extends and contracts in the axial direction. With this extension and contraction, the upper shaft 8 moves in the front-rear direction inside the outer column A together with the column pipe 6 and telescopic adjustment is performed. The extension and contraction in the axial direction during the telescopic adjustment are performed by the lower shaft 7 only, and the upper shaft 8 cannot extend and contract in the axial direction but reciprocates in the axial direction without changing the length thereof.

The rear-side end of the lower shaft 7 of the steering shaft, the front-side end of the upper shaft 8, and the universal joint 9 are disposed at positions at which the first and second linking portions 22 and 23 of the arm portion 2 are positioned and in the vicinity of the positions, so as to pass between the first and second linking portions 22 and 23. Moreover, with the telescopic adjustment, the rear-side end of the lower shaft 7, the front-side end of the upper shaft 8, and the universal joint 9 move between the first and second linking portions 22 and 23 (see FIGS. 4A to 4C).

The first linking portion 22 of the arm portion 2 is formed so as to protrude upward from upper edges 21a of the arm-shaped portions 21 (see FIG. 1C, FIGS. 3A to 3C, FIGS. 4A to 4C, and the like). The second linking portion 23 is formed so as to protrude downward from lower edges 21b of the arm-shaped portions 21. The central portions of the first and second linking portions 22 and 23 in the width direction are farthest in the up-down direction from the arm-shaped portions 21.

The first linking portion 22 is formed in an approximately circular arc shape in the width direction of the arm portion 2 and on the upper side of the arm-shaped portions 21. Specifically, the first linking portion 22 is formed in an arch shape that is convex to the upper side of the arm-shaped portions 21. Similarly, the second linking portion 23 is formed in an approximately circular arc shape in the width direction of the arm portion 2 and on the lower side of the arm-shaped portions 21. Specifically, the second linking portion 23 is formed in an arch shape that is convex to the lower side of the arm-shaped portions 21.

Moreover, the second linking portion 23 protrudes from the arm-shaped portions 21 by a larger amount than the first linking portion 22. That is, the distance Hb from the inner surface of the second linking portion 23 to the lower edges 21b of the arm-shaped portions 21 is larger than the distance Ha from the inner surface of the first linking portion 22 to the upper edges 21a of the arm-shaped portions 21 (see FIG. 3B). That is, Hb>Ha.

Figures 3A, 3B, 3C:
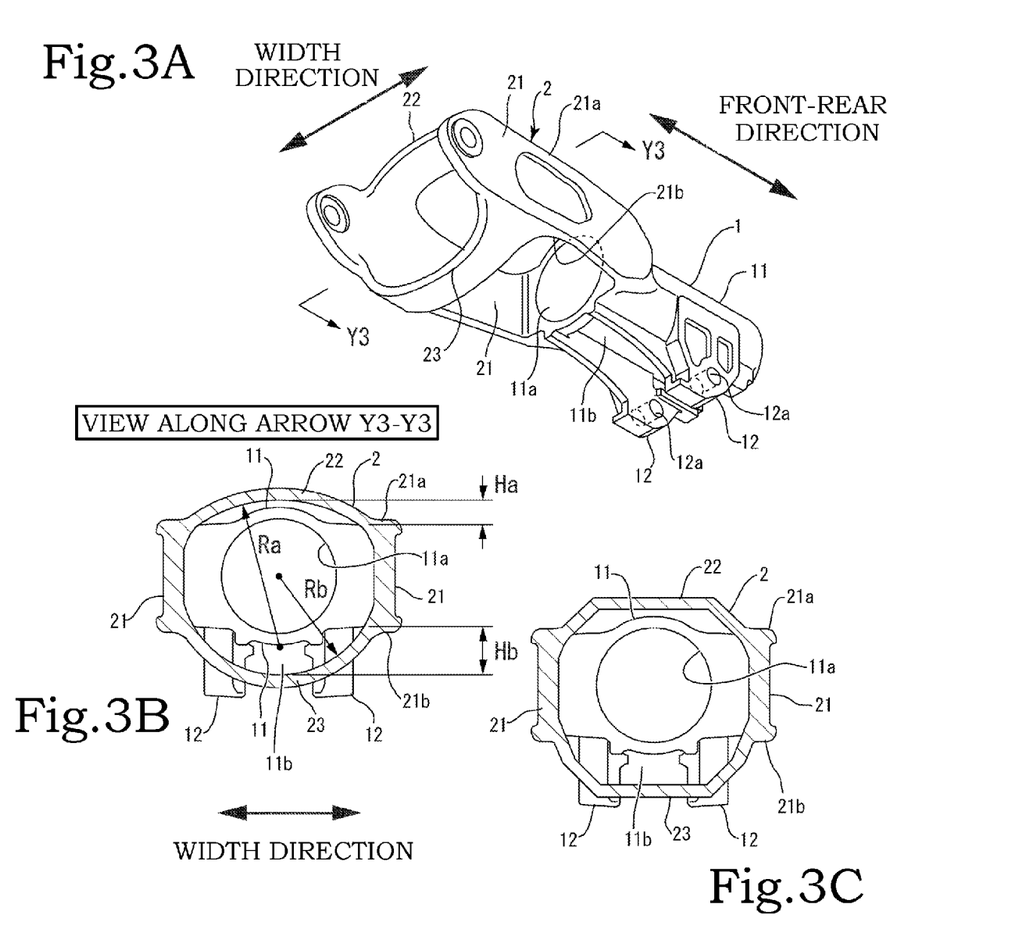
FIG. 3A is a perspective view of an outer column and a bifurcated arm-shaped portion which are integrated with each other.
FIG. 3B is an enlarged view taken along arrow Y3-Y3 in FIG. 3A.
FIG. 3C is an enlarged cross-sectional view of an outer column including a first linking portion and a second linking portion according to another embodiment.

Moreover, when the first and second linking portions 22 and 23 are formed in a circular arc shape, the radius of curvature Ra of the inner circumferential surface of the first linking portion 22 is larger than the radius of curvature Rb of the inner circumferential surface of the second linking portion 23 (see FIG. 3B). That is, Ra>Rb.

Here, the central positions of the radii of curvature Ra and Rb are not identical but are different positions that are shifted in the up-down direction. In this manner, the second linking portion 23 protrudes from the arm-shaped portions 21 by a larger amount than the first linking portion 22. That is, the void surrounded by the second linking portion 23 is larger than the void surrounded by the first linking portion 22.

Figures 4A, 4B, 4C:
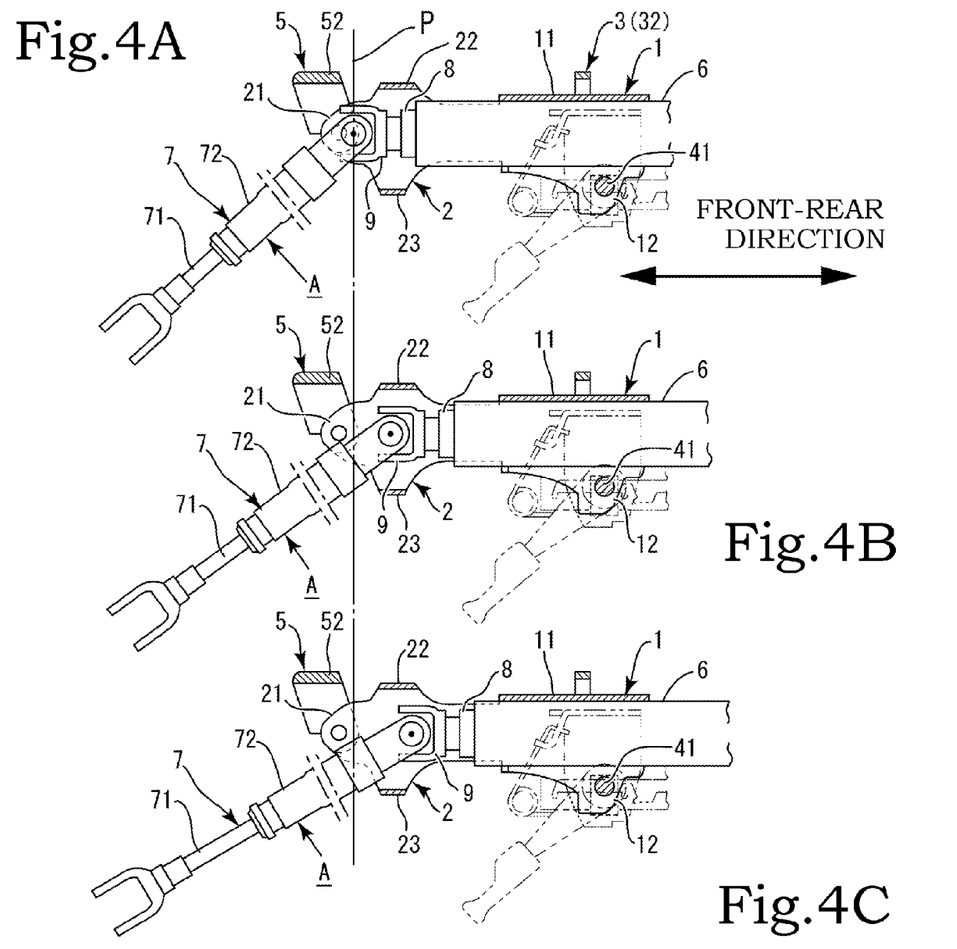
FIGS. 4A to 4C are vertical cross-sectional side views illustrating the operation of telescopic adjustment according to the present invention.

With such a configuration, during the telescopic adjustment, the rear-side end of the lower shaft 7, the front-side end of the upper shaft 8, and the universal joint 9 do not interfere with each other without making contact with the first and second linking portions 22 and 23 even when the portions move in the front-rear direction between the first and second linking portions 22 and 23 (see FIGS. 4A to 4C). The imaginary line depicted in FIGS. 4A, 4B, and 4C is an imaginary line P which is based on the position of the universal joint 9 in FIG. 4A. The movement amount in the axial direction of the universal joint 9 in FIGS. 4B and 4C is based on the imaginary line P.

In particular, since the void surrounded by the second linking portion 23 is larger than the void surrounded by the first linking portion 22, the rear-side end of the lower shaft 7 and the front-side end of the upper shaft 8 which are likely to be disposed on the lower side of the arm portion 2 (that is, close to the second linking portion 23) and the universal joint 9 can be reliably prevented from making contact with the second linking portion 23 (see FIGS. 4A to 4C).

Moreover, the length Lb in the axial direction of the second linking portion 23 is smaller than the length La in the front-rear direction of the first linking portion 22 (see FIG. 1B). That is, Lb<La.

Since force is applied to the first linking portion 22 at a position near a vehicle body attachment portion of the lower bracket 5, at which the arm-shaped portions 21 of the arm portion 2 are attached to the vehicle body and which is supported so as to freely swing, the stress applied to the arm portion 2 increases.

Thus, by decreasing the length Lb in the front-rear direction of the second linking portion 23, it is possible to improve the rigidity of the arm-shaped portions 21 of the arm portion 2 to improve the durability against the stress applied to the arm portion 2 and to realize light weight. Moreover, since the length in the front-rear direction of the first linking portion 22 is larger than that of the second linking portion 23, the first linking portion 22 has higher rigidity than the arm-shaped portions 21.

It is not always necessary to increase the length in the front-rear direction of the first linking portion 22. When the stress applied to the second linking portion 23 is large, the length in the front-rear direction of the second linking portion may be larger than that of the first linking portion. The stress applied to the second linking portion 23 is large, for example, when the position of the pivotal linking portion for the lower bracket 5 is close to the second linking portion 23.

Although the first and second linking portions 22 and 23 are formed in a circular arc shape, the shape is not limited to the circular arc shape but may be a polygonal shape. When a polygonal shape is used, a trapezoidal shape or a rectangular shape may be used (see FIG. 3C). When the first and second linking portions 22 and 23 are formed in a rectangular or trapezoidal shape, the length in the front-rear direction of a linking portion to which stress is applied may be set to be larger than that of the other linking portion as in the linking portions having the circular arc shape. By doing so, the rigidity can be improved.

Practically, the steering shaft (in the attached state) of the steering apparatus is inclined in the left-right direction as well as the front-rear direction. Specifically, although the upper shaft 8 is inclined in the front-rear direction only, the lower shaft 7 is inclined in both the up-down direction and the left-right direction and is connected to a rack-and-pinion mechanism (not illustrated) of the steering apparatus.

In such a state, the first and second linking portions 22 and 23 of the arm portion 2 can perform smooth tilt/telescopic and steering operations without interfering with the lower shaft 7, the upper shaft 8, and the universal joint 9 during the telescopic adjustment (see FIGS. 4A to 4C).

Figure 5:
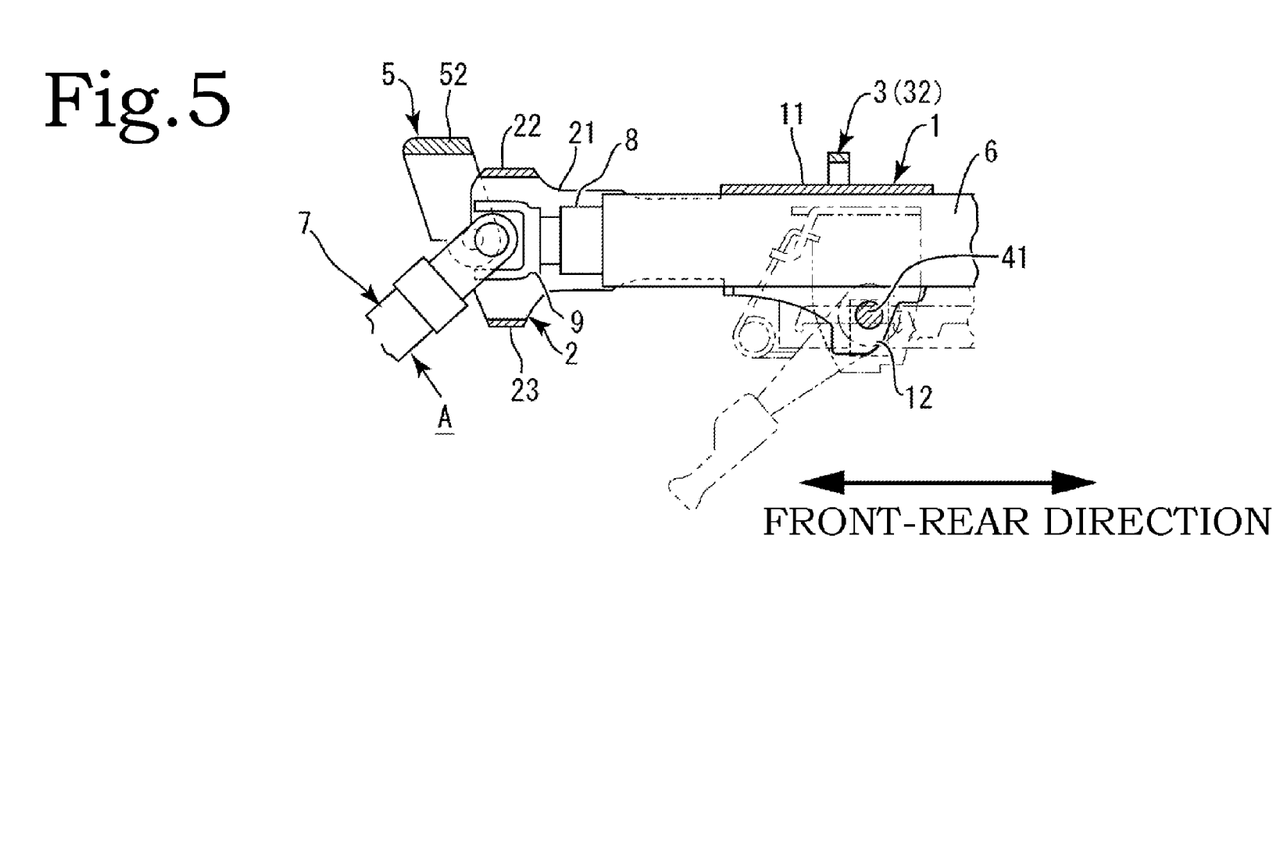
FIG. 5 is a side view of a principal part of an embodiment in which a first linking portion and a second linking portion are formed at a front end of a arm-shaped portion.

The first and second linking portions 22 and 23 of the arm portion 2 are often formed at the vehicle-body-front-side ends of the arm-shaped portions 21. That is, the first and second linking portions 22 and 23 are formed approximately at the same position at the vehicle-body-front-side ends of the arm-shaped portions 21 (see FIG. 5). Due to this, the first and second linking portions 22 and 23 and the lower bracket 5 that supports the arm portion 2 concentrate approximately on the same position. Thus, deformation or deflection in the width direction of the arm-shaped portions 21 does not occur and the rigidity of the entire steering column can be improved. Therefore, the rigidity in the fixed state of the tilt/telescopic position of the steering column can be increased, the play of the steering column can be suppressed, and the steering operation feeling can be improved.

The first and second linking portions 22 and 23 of the arm portion 2 are sometimes formed in the arm-shaped portions 21 with the positions in the front-rear direction shifted from each other. Specifically, the second linking portion 23 is positioned closer to the vehicle-body-front side than the first linking portion 22. Due to this, the first and second linking portions 22 and 23 can be further prevented from interfering with the lower shaft 7 and the universal joint 9 and the degree of freedom of the layout can be increased.

In a second embodiment, the first linking portion is formed in a circular arc shape that protrudes upward from the arm-shaped portions and the second linking portion is formed in a circular arc shape that protrudes downward from the arm-shaped portions. With this configuration, the first and second linking portions are formed in an arch shape on the upper and lower sides of the arm-shaped portions and the mechanical strength can be increased and a strong structure can be provided.

Further, when the second linking portion has a circular arc shape of which the radius of curvature is smaller than that of the first linking portion, the first linking portion has a small upward protrusion amount and the second linking portion has a large downward protrusion amount. In a third embodiment, since the first and second linking portions are formed at the front-side ends of the arm-shaped portions, the first and second linking portions can be disposed approximately at one position on the front side of the arm-shaped portions. Since the first and second linking portions are formed at the vehicle-body-front-side ends of the arm portion, it is possible to further improve the rigidity of the arm portion and to provide a strong structure.

In a fourth embodiment, since the positions of the first and second linking portions in a front-rear direction are shifted from each other, it is possible to prevent interference between the universal joint and the lower shaft more reliably. In a fifth embodiment, since a dimension of the second linking portion in a front-rear direction is smaller than that of the first linking portion, it is possible to reduce the weight of the second linking portion and to reduce the weight of the entire apparatus.

What is claimed is:
1. A steering apparatus comprising:
a fixed bracket having fixing side portions on both sides in a width direction;
an outer column attached to the fixed bracket so as to freely swing;
an arm portion;
a column pipe;
a steering shaft including an upper shaft which is rotatably attached to the column pipe and a lower shaft which is connected to the upper shaft by an universal joint and in which a male shaft and a female shaft engage with each other so as to freely extend and contract; and
a fastening tool, wherein
the arm portion includes:
bifurcated arm-shaped portions that extend from a front side in an axial direction of the outer column toward an outer side in the axial direction;
a first linking portion formed between the arm-shaped portions so as to protrude upward from upper edges of the arm-shaped portions; and
a second linking portion that protrudes downward from lower edges of the arm-shaped portions, and
the second linking portion protrudes from the arm-shaped portions by a larger amount than the first linking portion.
2. The steering apparatus according to claim 1, wherein the first linking portion is formed in a circular arc shape that protrudes upward, the second linking portion is formed in a circular arc shape that protrudes downward, and the second linking portion has a smaller radius of curvature than the first linking portion.

3. The steering apparatus according to claim 1, wherein the first and second linking portions are formed at front-side ends of the arm-shaped portions.

4. The steering apparatus according to claim 1, wherein the positions of the first and second linking portions in a front-rear direction are shifted from each other.

5. The steering apparatus according to claim 1, wherein a dimension of the second linking portion in a front-rear direction is smaller than that of the first linking portion.

6. The steering apparatus according to claim 2, wherein the first and second linking portions are formed at front-side ends of the arm-shaped portions.

7. The steering apparatus according to claim 2, wherein the positions of the first and second linking portions in a front-rear direction are shifted from each other.

8. The steering apparatus according to claim 2, wherein a dimension of the second linking portion in a front-rear direction is smaller than that of the first linking portion.

* * * * *